United States Patent
Wilson et al.

(10) Patent No.: US 7,395,402 B2
(45) Date of Patent: Jul. 1, 2008

(54) METHOD AND SYSTEM OF DATA STORAGE CAPACITY ALLOCATION AND MANAGEMENT USING ONE OR MORE DATA STORAGE DRIVES

(75) Inventors: Chris Wilson, Sunnyvale, CA (US); Viresh Rustagi, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 419 days.

(21) Appl. No.: 11/087,136

(22) Filed: Mar. 22, 2005

(65) Prior Publication Data

US 2005/0235337 A1    Oct. 20, 2005

Related U.S. Application Data

(60) Provisional application No. 60/648,634, filed on Jan. 31, 2005, provisional application No. 60/562,847, filed on Apr. 15, 2004.

(51) Int. Cl.
  *G06F 12/00* (2006.01)
(52) U.S. Cl. .................. 711/173; 711/162; 711/171
(58) Field of Classification Search ............. 711/170, 711/171, 173, 162; 714/6, 7; 707/202, 204
See application file for complete search history.

(56) References Cited

U.S. PATENT DOCUMENTS

| | | | |
|---|---|---|---|
| 5,367,682 A * | 11/1994 | Chang ...................... 713/1 |
| 5,539,879 A | 7/1996 | Pearce et al. | |
| 5,680,540 A * | 10/1997 | Pearce ...................... 714/24 |
| 6,173,376 B1 * | 1/2001 | Fowler et al. ............... 711/162 |
| 6,438,639 B1 * | 8/2002 | Bakke et al. ............... 710/302 |
| 6,578,034 B1 * | 6/2003 | Rafanello ................... 707/10 |
| 6,615,365 B1 | 9/2003 | Jenevein et al. | |
| 6,675,176 B1 * | 1/2004 | Shinkai et al. ............ 707/200 |
| 6,675,242 B2 * | 1/2004 | Benson et al. ............ 710/104 |
| 6,963,951 B2 * | 11/2005 | Ng et al. ................... 711/112 |
| 7,299,314 B2 * | 11/2007 | Lin et al. .................. 711/103 |
| 2002/0059539 A1 | 5/2002 | Anderson | |
| 2003/0023811 A1 | 1/2003 | Kim et al. | |
| 2005/0081004 A1 * | 4/2005 | Zhang ....................... 711/162 |

* cited by examiner

*Primary Examiner*—Jack A Lane
(74) *Attorney, Agent, or Firm*—McAndrews, Held & Malloy, Ltd.

(57) ABSTRACT

Aspects of the present invention allow the implementation of one or more data pools using portions or sectors of one or more hard disk drives. Aspects of the invention incorporate at least a method and system of implementing the one or more data pools. The method of implementing a data pool using one or more data storage drives may comprise first generating a first partition table and a second partition table, wherein the first partition table is a mirror image of said second partition table. The method further comprises second generating a first pool information block and a second pool information block, wherein the first pool information block is a mirror image of said second pool information block. The system of implementing a data pool using one or more data storage drives may comprise a memory, a software resident in the memory, and a processor capable of executing the software.

30 Claims, 13 Drawing Sheets

Block Diagram of NAS

POOL INFORMATION BLOCK STRUCTURE

| 1104 Data Pool Name | 1108 1st zero pad. | 1112 unique pool I.D. | 1116 NAS I.D. | 1120 2nd zero pad. | 1124 TIME DATE | 1128 3rd zero pad. field | 1132 Stripe mir. field | 1136 mir. field | 1140 spares field | 1144 panes field | 1148 chunk field | 1152 chunk I.D. | 1156 Chunk RAID | 1160 pane partition specification |

| 1164 chunk part. spec. | 1168 restr. flag | 1172 reverse prog. | 1176 forward prog. | 1180 old size | 1184 new size | 1188 fourth zero padding | 1192 valid pool info. |

FIGURE 11

METHOD AND SYSTEM OF DATA STORAGE CAPACITY ALLOCATION AND MANAGEMENT USING ONE OR MORE DATA STORAGE DRIVES

RELATED APPLICATIONS/INCORPORATION BY REFERENCE

This Application makes reference to and claims priority from U.S. Provisional Patent Application Ser. No. 60/562, 847, entitled "METHOD AND SYSTEM OF HARD DISK DRIVE CAPACITY ALLOCATION AND MANAGEMENT" filed on Apr. 15, 2004, the complete subject matter of which is incorporated herein by reference in its entirety.

This Application makes reference to and claims priority from U.S. Provisional Patent Application Ser. No. 60/648, 634, entitled "METHOD AND SYSTEM OF DATA STORAGE CAPACITY ALLOCATION AND MANAGEMENT USING ONE OR MORE DATA STORAGE DRIVES" filed on Jan. 31, 2005, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

As the data storage requirements of a data processing or computing device increases, a user may wish to add one or more additional data storage drives. Unfortunately, adding such data storage drives may be an arduous task. The user may need to disassemble, configure, and re-connect one or more data storage drives in order to accommodate the additional data storage drive(s). Further, the added data storage drives may need to be manually configured by way of a number of tedious steps. In some instances, one or more software applications must be executed in order to adequately partition the added data storage drive(s). Further, the user, in many instances, may desire the added redundancy and throughput provided by mirroring and striping the data storage drives. Often, however, this task may involve a number of complex steps and may be difficult to implement. Hence, as the data storage requirements of a user increase, it becomes increasingly important to be able to quickly and efficiently add data storage capacity that suits the user's needs.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention incorporate at least a method and system of hard disk drive capacity allocation and management. Various aspects of the present invention allow the formation of one or more data pools using portions or sectors of one or more hard disk drives. The aforementioned aspects are substantially shown and described in connection with at least one of the following figures, as set forth more completely in the claims.

These and other advantages, aspects, and novel features of the present invention, as well as details of illustrated embodiments, thereof, will be more fully understood from the following description and drawings.

DESCRIPTION OF THE DRAWINGS

FIG. 11 is a relational block diagram illustrating the structure of a pool information block in accordance with an embodiment of the invention.

DETAILED DESCRIPTION OF THE INVENTION

Figure 1:
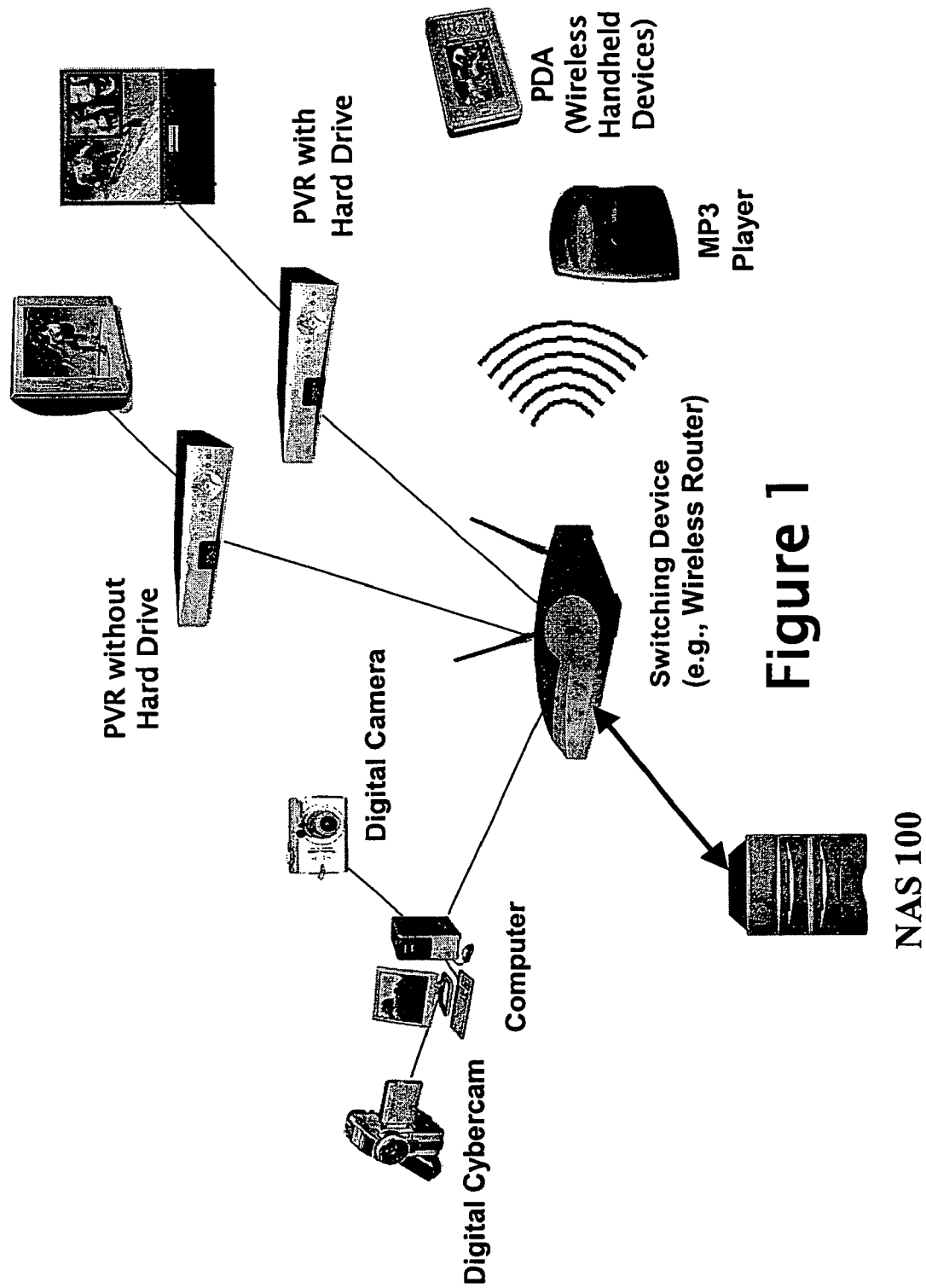
FIG. 1 illustrates a block diagram of a typical system incorporating the use of a networked attached storage device (NAS) in accordance with an embodiment of the invention.

Aspects of the invention incorporate at least a method and system of data storage drive capacity allocation and management. The various aspects of the present invention allow one or more data storage drives to be added to a system comprising one or more existing data storage drives. After the one or more data storage drives are added, the system is configured to suit the data storage needs of one or more users. After incorporation of the data storage drives, all data storage drives may be collectively analyzed and reconfigured to suit the requirements of the user. In a representative embodiment, any unused or unallocated space over all data storage drives may be partitioned into one or more data pools, such that any available storage space in any data storage drive is utilized.

The data storage device may comprise one or more data storage drives, such as hard disk drives, or any other type of drive. The data storage device may comprise a combination of different types of data storage drives. A data storage drive may comprise any type of media capable of storing data. Hereinafter, the term "hard disk drive" alternatively may refer to a data storage drive or any drive or component comprising a media used to store data. In a representative embodiment, one or more data storage drives or hard disk drives may be incorporated into a data storage device. The data storage device comprises the one or more data storage drives or hard disk drives. In a representative embodiment, the data storage device facilitates the incorporation of the one or more additional data storage drives or hard disk drives.

Further, aspects of the invention provide a system and method that facilitates the automated pooling, mirroring, and striping of data storage capacity provided by one or more hard disk drives. In addition, aspects of the invention permit the use of drives of different sizes and speeds when performing RAID functions.

Various aspects of the present invention allow the formation of one or more data pools using portions or sectors of one or more hard disk drives. The pools may be considered logical drives. The unallocated space over the one or more hard drives may be re-partitioned and one or more partitions may then be subsequently concatenated in order to generate a data pool. The one or more partitions may be mirrored or striped using the one or more hard disk drives. Portions of multiple hard disk drives may be used to create the data pool. For example, a portion of a first hard disk drive and a portion of a second hard disk drive may be used to form a data pool. In a representative embodiment, the hard disk drives are grouped together to provide increased data storage capacity and/or to provide data mirroring or data striping. In a representative embodiment, the grouped or linked hard disk drives are physically contained within a single data storage device. The data storage device may be networked in a local area network, for example, to provide a storage facility for any number of data processing or computing devices. The data processing or computing devices may comprise one or more computers. Additional aspects of the invention provide shared access by one or more users to the one or more data pools created in the storage device. Hereinafter, the data storage device may be termed a network attached storage device (NAS). A data pool may be accessed by one or more users by way of creating one or more shares. In a representative embodiment, a data pool may comprise one or more shares. Each share of the one or more shares may allocate a portion of a data pool.

FIG. 1 illustrates a block diagram of a typical system incorporating the use of a NAS 100 in accordance with an embodiment of the invention. The NAS 100 provides data storage for one or more data processing devices. As illustrated, an exemplary switching device provides connectivity of the NAS 100 to the one or more data processing devices. The switching device is capable of providing connectivity using wireless or wireline communications. For example, a wireless router may utilize any one of the following wireless or wireline data communications protocols: 10/100 Ethernet, gigabit Ethernet, 802.11x, Bluetooth, and the like. The one or more data processing devices comprises devices such as a digital cybercam, digital camera, MP3 player, PDA, and one or more personal video recorders (PVRs). As illustrated, the PVR may be equipped with or without a hard disk drive. In a representative embodiment, the PVR may be referred to as a set-top-box (STB) that incorporates personal video recorder capabilities. As a consequence, the PVR may be referred to as a PVR-STB. As shown, the PVRs are connected to a television or a monitor capable of displaying multimedia content to a user. Use of the NAS 100 provides a centralized storage device for multimedia content received by the one or more PVRs. As a consequence of storing content in a NAS 100, PVRs lacking a storage facility, such as a hard disk drive, may store any data it receives into the NAS 100. Further, any data stored by other data processing devices, including PVRs, may be easily accessed and viewed by any of the one or more data processing devices. For example, a PVR without hard drive may access multimedia content originally stored into the NAS 100 by a PVR with hard drive, and vice-versa. As a result, the NAS 100 facilitates sharing of data among the one or more data processing devices. Since it provides a remote storage mechanism, the NAS 100 may be considered a "virtual storage device" by the one or more data processing devices. The NAS 100 is configured such that its storage capacity may be easily expanded. For example, the NAS 100 may accept one or more additional hard disk drives. A NAS 100 may be configured to easily accept additional data storage drives, such as hard disk drives. An additional hard disk drive may be connected to the NAS 100 by using a suitable cable and/or connector. As such, the NAS 100 provides an easily scalable and flexible storage mechanism that accommodates for future data storage growth. In addition, the NAS 100 may provide data mirroring and data striping capabilities.

Figure 2:
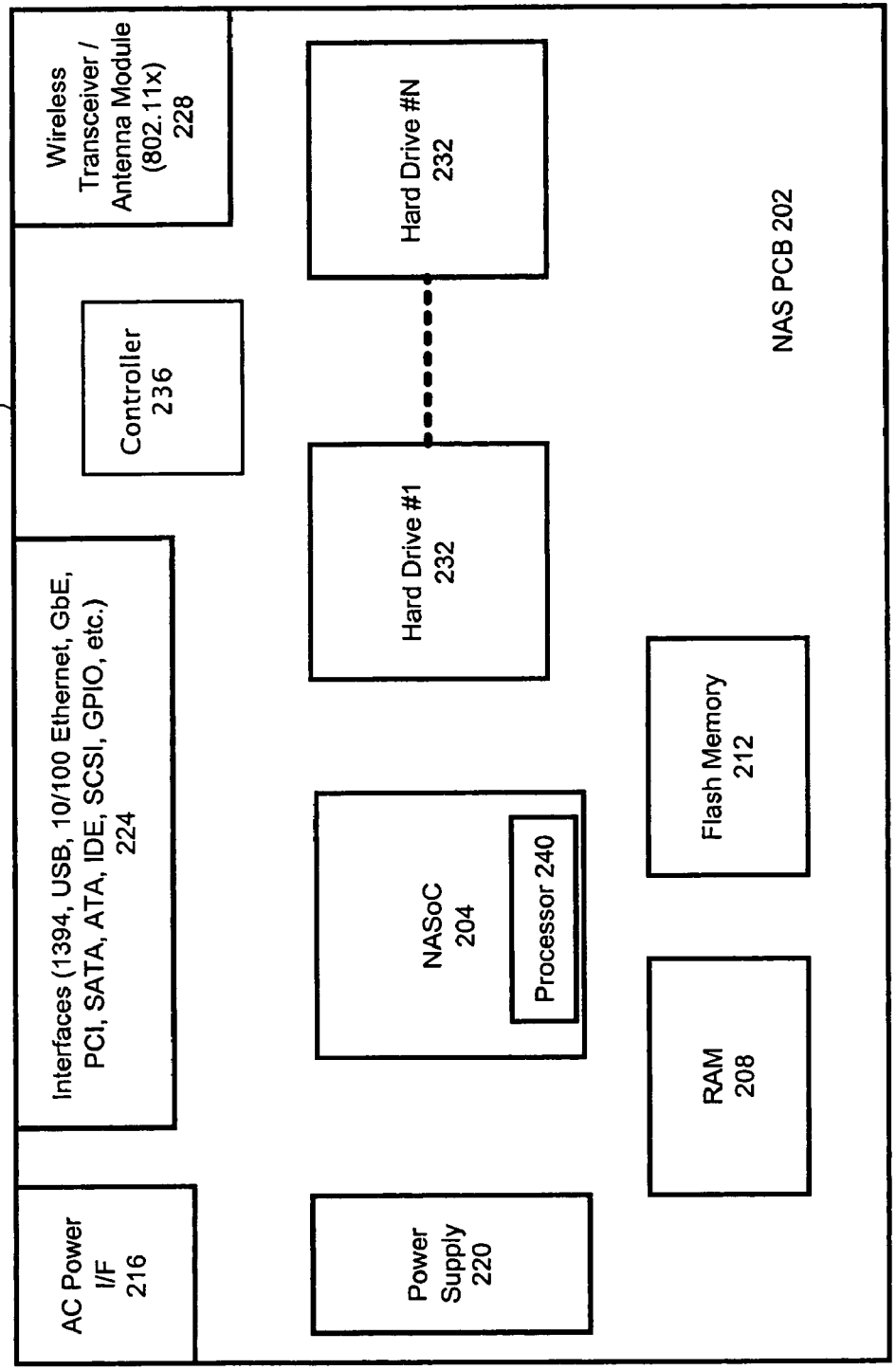
FIG. 2 is a block diagram of a network attached storage device (NAS) in accordance with an embodiment of the invention.

FIG. 2 is a block diagram of a network attached storage device (NAS) 200 in accordance with an embodiment of the invention. The NAS 200 comprises a printed circuit board (NAS PCB) 202 containing one or more components. The one or more components are electrically connected by way of the printed circuit board (PCB) 202. The one or more components comprises a NAS chip (NASoC) 204, a random access memory 208, a flash memory 212, an AC power interface 216, a power supply 220, a block of interfaces 224, a wireless transceiver/antenna module 228, one or more hard disk drives 232, and a controller 236. The interface block 224 may comprise one or more of the following interfaces: IEEE 1394, USB, 10/100 Ethernet, gigabit Ethernet, PCI, SATA, ATA, IDE, SCSI, GPIO, etc. The wireless transceiver/antenna module 228 may comprise an attachable module or mini-PCI card that may be optionally connected or attached to the NAS' printed circuit board 202. The one or more hard disk drives 232 may comprise any number of hard drives depending on the design of the NAS 200. The printed circuit board 202 may be configured to accommodate an appropriate number of hard disk drives. The number of hard drives utilized may depend on the type of mirroring or data striping (i.e., RAID) provided by the NAS 200. Aspects of the invention provide a means to allocate one or more portions of one or more hard disk drives into a data pool. For example, portions of one drive may be concatenated with portions from another drive in order to create a data pool. Further aspects of the invention provide a method of expanding storage capacity by adding additional hard disk drives to the NAS. Additional aspects of the present invention include the implementation of data striping and/or data mirroring (i.e., implementation of various RAID level functionality) of one or more data pools using one or more drives of differing sizes and speeds. In one embodiment, the controller 236 provides control for any one of several devices (such as hard disk drives) connected to the NASoC 204. The controller may comprise an IDE or SATA controller, for example. The NASoC 204 may comprise an integrated circuit chip incorporating a processor or central processing unit (CPU) 240.

Figure 3:
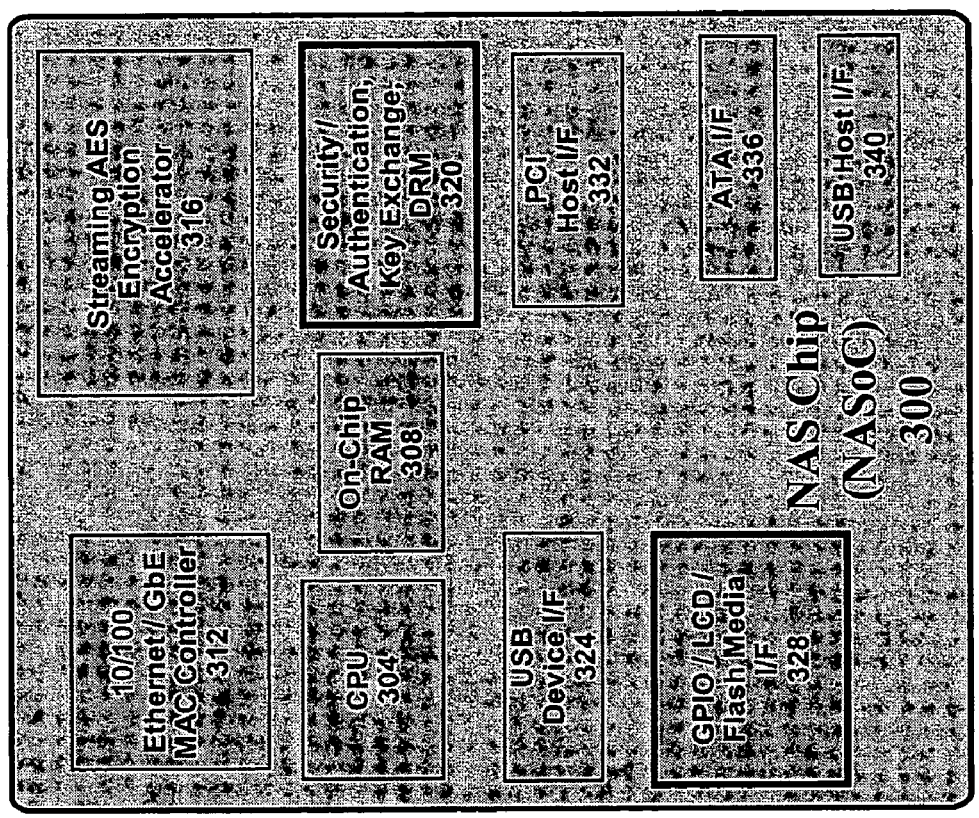
FIG. 3 is a block diagram of a NAS chip (NASoC) in accordance with an embodiment of the invention.

FIG. 3 is a block diagram of a NAS chip (NASoC) 300 in accordance with an embodiment of the invention. The NASoC 300 is an integrated circuit mounted on the previously described NAS PCB. The NASoC 300 provides one or more functions that allow the NAS to properly operate. The NASoC 300 comprises a central processing unit (CPU) 304, an on-chip random access memory 308, an Ethernet/MAC controller 312, an encryption accelerator 316, a security/authentication, key exchange, digital rights management (DRM) circuitry 320, and a number of interfaces 324, 328, 332, 336, 340. The interfaces 324, 328, 332, 336, 340 may comprise, for example, the following type of interfaces: USB Device I/F 324, a PCI Host I/F 332, a GPIO/LCD/Flash Media I/F 328, an ATA I/F 336, and a USB Host I/F 340. The NAS chip 300 may communicate and/or connect to the one or more components described in reference to FIG. 2.

Referring to FIG. 2, the NAS may incorporate varying numbers of hard disk drives depending on its data storage and RAID (data mirroring and/or striping) requirements. The NAS 200 chassis may be configured to incorporate 1, 2, 4, or more hard disk drives depending on type of use. For example, the NAS may utilize 4 hard disk drives for implementing RAID 1+0 (both data mirroring and data striping), suitable for use in a small office/business environment. Aspects of the invention provide for using hard disk drives of different capacities, types, and/or speeds when implementing RAID functions. The NAS may utilize only 1 or 2 hard disk drives in a home (or household) environment since the storage capacity utilized is typically less than that utilized in an office or business environment. Similarly, memory components utilized in the NAS may be varied depending on type of use. As the data storage requirements increase and as the frequency of data storage related requests increase, the performance of the NAS may be improved to meet its operational needs, by way of increasing memory size of the NAS. For example, flash or DRAM memory capacities may be increased in order to improve the processing performance of the NAS. Similarly, the chassis size, power circuitry, and other components may be adjusted to meet the processing requirements of its operational environment.

In one embodiment, the processor 240 within the NASoC (204 or 300) executes software or firmware residing within the RAM 208 or flash memory 212 when the NAS is booted up or powered up. In one embodiment, execution of the software or firmware generates one or more user interfaces allowing a user to configure one or more data pools using portions of one or more hard disk drives. The user interfaces also facilitate configuring one or more RAID levels associated with the one or more data pools.

In one embodiment, execution of the software causes the http server to serve pages at a user's workstation (e.g., client workstation) facilitating the display of a desired user interface. In one embodiment, the software that is executed by the processor 240 comprises a configuration file that is accessed and recognized by an operating system, such as a Microsoft Windows operating system, such that it may be viewed and run by the exemplary Windows Explorer application. In one embodiment, the configuration file is accessible before a user completes an initialization procedure on the NAS. The initialization process may involve creating one or more authentication passwords that are used in the future for accessing the configuration process. The Microsoft Windows operating system may comprise Windows XP, 2000, ME, 98, Pocket PC, or the like. When the configuration file is executed, by clicking on its filename as displayed by the Windows Explorer application, a user interface is displayed to a user's data processing device. Thereafter, a user may provide one or more inputs to initialize or configure the NAS. The inputs may comprise the following: a name for the NAS, an administration username, an administration password, one or more alternate security actuators, time, time zone, network time server internet protocol addresses, drive pool names, RAID indicators, drive pool share names, and share access passwords. The drive pool names, RAID indicators, drive pool share names, and share access passwords are exemplary parameters used in the disk drive management of the hard drives within the NAS. In one embodiment, the previously mentioned disk drive management parameters are stored in the flash memory of the NAS, as previously referenced in FIG. 2. The flash memory may comprise a non-volatile random access memory (NVRAM).

Figure 4:
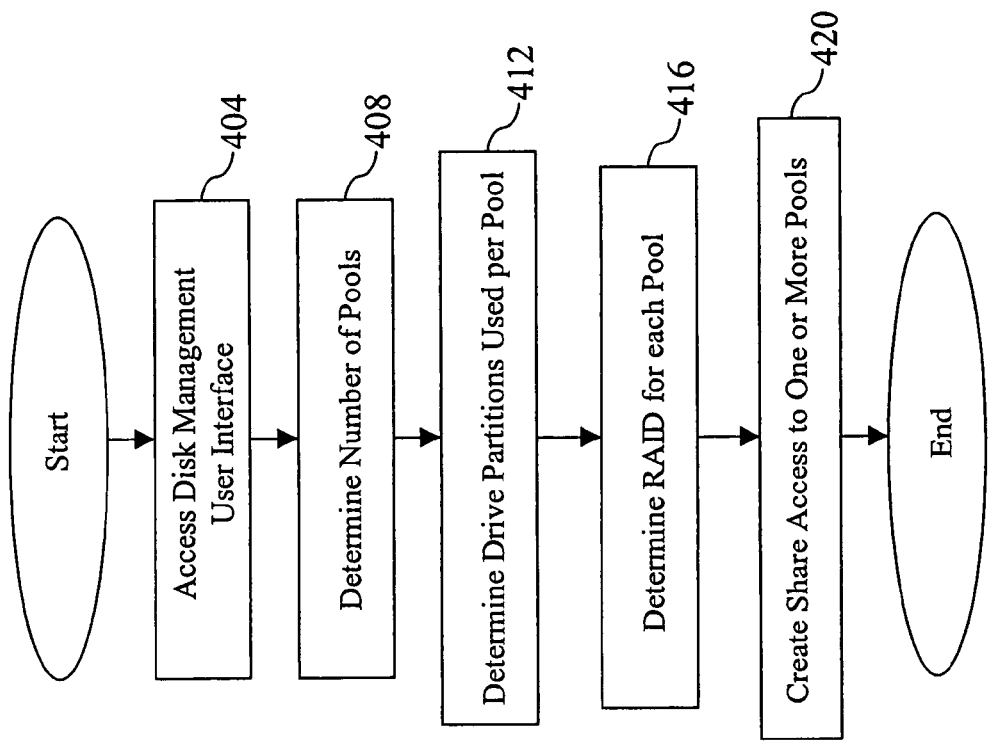
FIG. 4 is an operational flow diagram illustrating the allocation of pools and the management of one or more hard disk drives within a NAS, in accordance with an embodiment of the invention.
Figure 5:
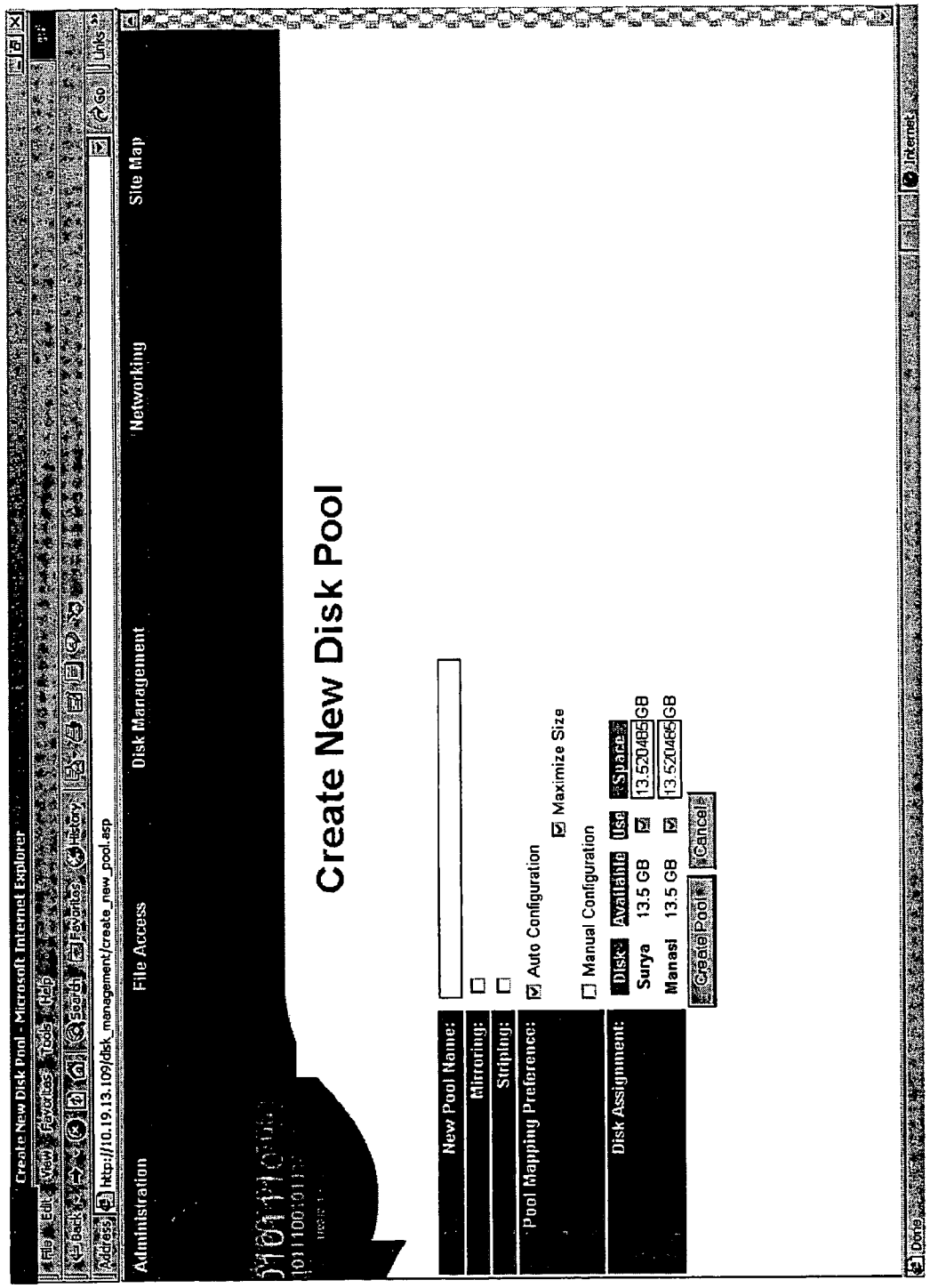
FIG. 5 displays two disk drives named Surya and Manasi, each having available capacities of 13.5 Gbytes, in accordance with an embodiment of the invention.
Figure 6:
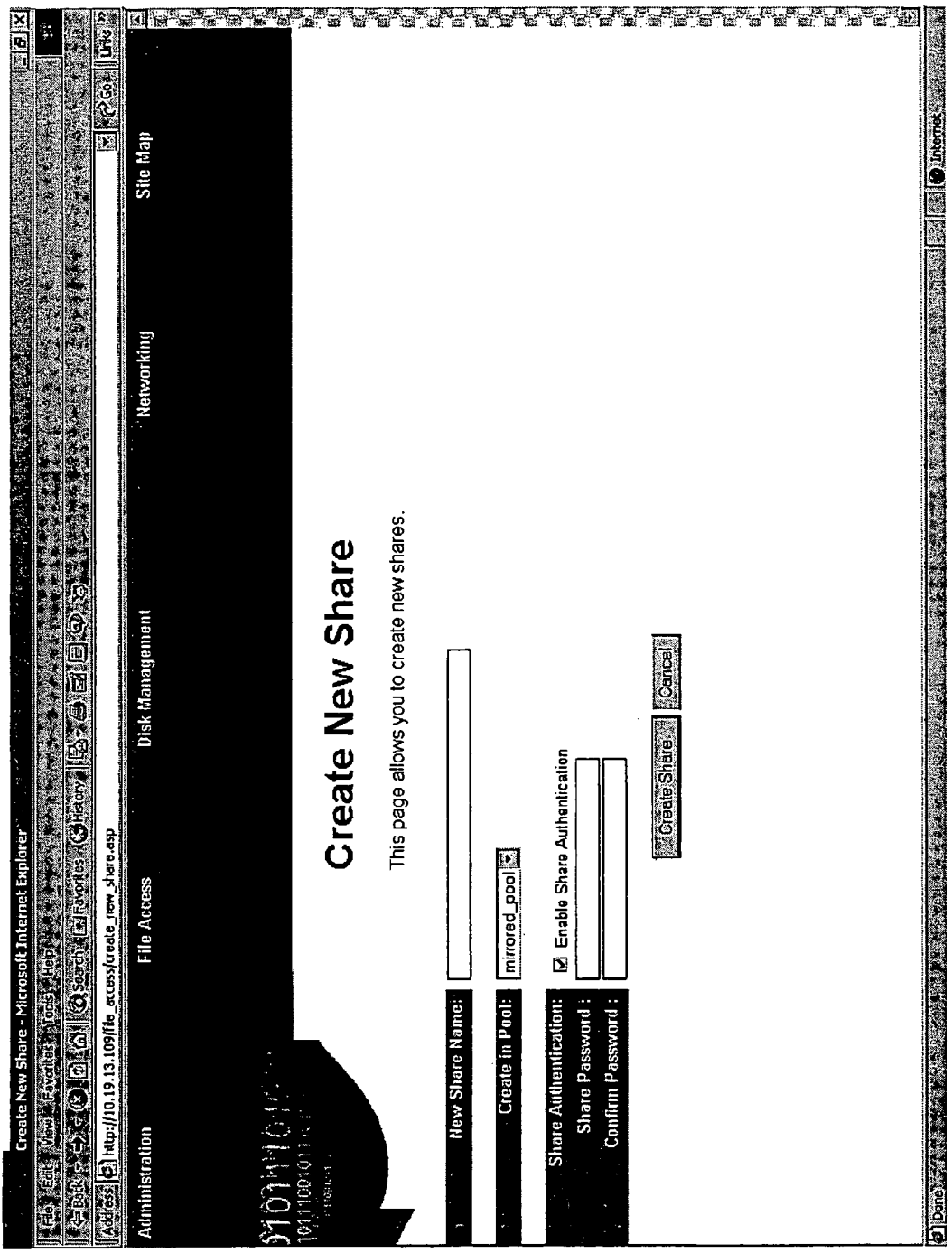
FIG. 6 provides a screen shot of a browser, such as Netscape, that facilitates the creation of shares, in accordance with an embodiment of the invention.
Figure 7:
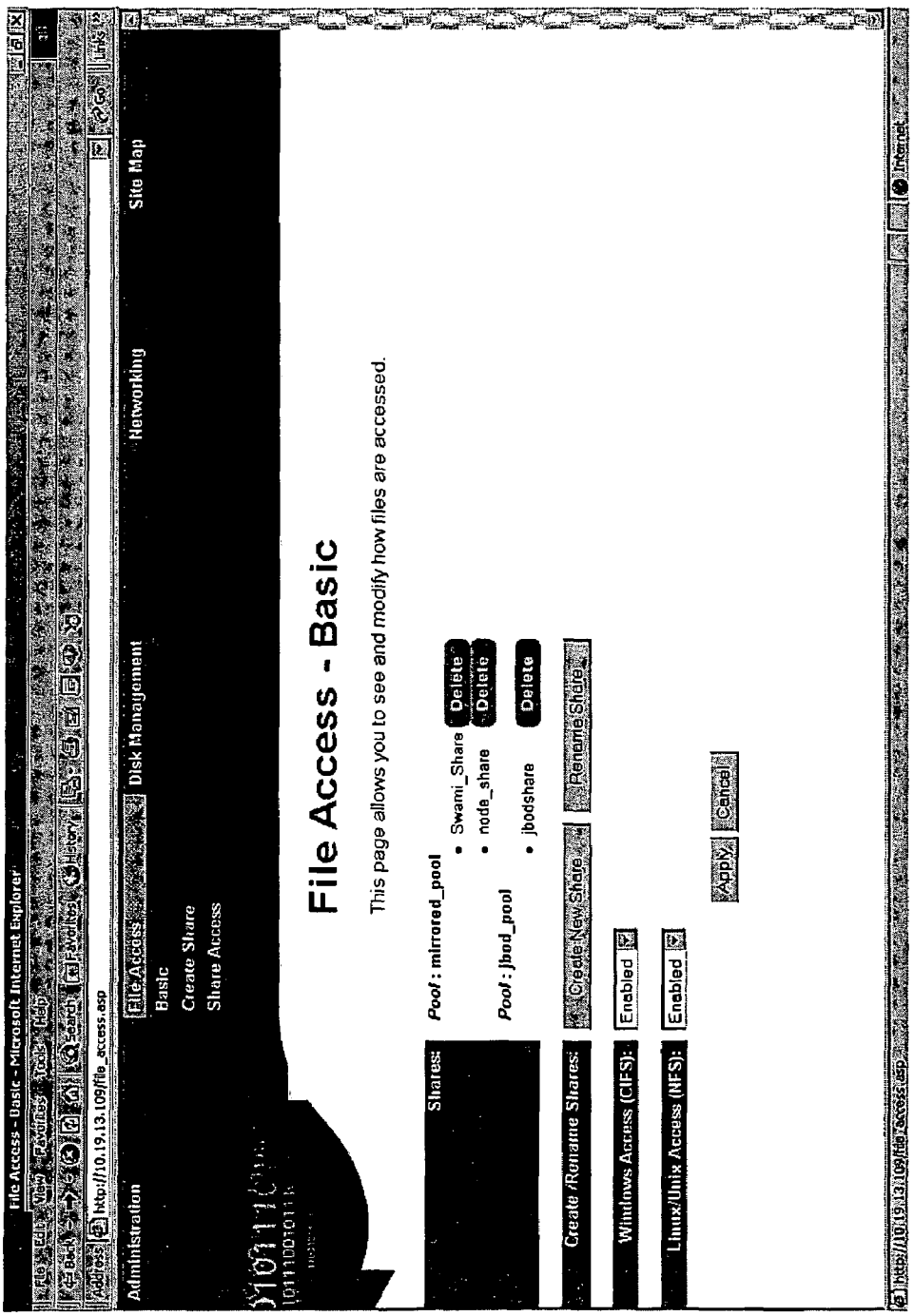
FIG. 7 provides a screen shot of a browser that displays one or more shares associated with one or more data pools and facilitates the creation or deletion of the one or more shares associated with the one or more pools, in accordance with an embodiment of the invention.

FIG. 4 is an operational flow diagram illustrating the allocation of pools and the management of one or more hard disk drives within a NAS, in accordance with an embodiment of the invention. At step 404, a user accesses the appropriate disk management user interface. In one embodiment, the disk management user interface is generated after a user inputs an authorized password into the user interface. In a representative embodiment, a configuration file is executed in order to generate one or more user interfaces, one of which includes the disk management user interface. FIG. 5 illustrates a screen shot of a browser, such as Windows Explorer or Netscape, providing an exemplary disk management interface that allows a user to input one or more new disk pool parameters. At step 408 the user determines the number and type of pools to be created. Referring back to FIG. 5, the user may input a new pool name and assign disk drive space to one or more disk drives provided. FIG. 5 displays two disk drives named Surya and Manasi, each having available capacities of 13.5 Gbytes, in accordance with an embodiment of the invention. The exemplary user interface provides fields in which a user may adjust the allocation size in each of the two disk drives. The user interface also allows a user to determine whether mirroring or striping of the pool is to occur. At step 412, the user may determine the allocations of the one or more drives that contribute to forming a data pool. At step 416, the user may indicate the RAID level for the data pool created. In a representative embodiment, the following RAID levels may be indicated using the user interface: RAID0, RAID1, and RAID0+1. At step 420, one or more shares are created for the one or more pools previously generated. FIG. 6 provides a screen shot of a browser, such as Netscape Navigator, that facilitates the creation of shares, or share directories, used for sharing data stored within a data pool, in accordance with an embodiment of the invention. A pool comprises disk space that is associated with one or more shares. In a representative embodiment, a share may comprise a subdirectory that may contain one or more data files. A share allows one or more users to access space within a data pool. In a representative embodiment, share access rights may be given to a user when an administrator provides the user with a password. The administrator may configure a password of a share by using the graphical user interface shown in FIG. 6. If there is more than one share for a pool, the disk space occupied by each share is cumulatively applied against the total space provided by the pool. In a representative embodiment, a share or its shared directory may occupy a portion of a data pool. One or more shares may occupy non-overlapping portions of a data pool, for example. FIG. 7 provides a screen shot of a browser that displays one or more shares associated with one or more data pools and facilitates the creation or deletion of the one or more shares associated with the one or more pools, in accordance with an embodiment of the invention. The one or more user interfaces previously described are exemplary, and it is contemplated that various other embodiments of user interfaces may be adapted in accordance with the present invention.

Various aspects of the invention provide a mechanism for storing a file system across parts of one or more data storage drives. This mechanism includes features for dynamically changing the size and layout of the file system across the one or more data storage drives and robustly recovering from loss or temporary unavailability of one or more data storage drives during, for example, an interruption of power when performing changes to a data pool. The changes may comprise modifications to the size and layout of the file system across the one or more data storage drives.

The external interface to the mechanism may comprise a fairly conventional file system interface plus specialized control functionality for dealing with changes in the size and layout of the file system across the disks. The file system interface may closely resemble the standard file system interfaces used by various operating systems. These include Linux, Unix, and Windows file systems. In a representative embodiment, there is a tree of directories containing files. Further, the file system incorporates metadata for each file or directory. The metadata includes the name of the file or directory, the last access time, the owner, read and write permissions. The file system interface allows creating, deleting, reading, and writing files into one or more directories. Further, the file system allows reading and modifying the files and the metadata. The file storing mechanism is implemented in two major parts—termed a low-level data part and a file system data part. The two data parts communicate through a simple interface that provides the file system data part with access to what appears to it as a flat array of data bytes. This flat array is termed a mid-level data array. In a representative embodiment, the file system part comprises a conventional file system. Any of a number of standard file systems, such as Reiser FS, JFS, ext3fs, or NTFS, may be used for the file system data part. Implementations of these file systems that were created to run on a simple disk or disk partition device may be used unchanged or nearly unchanged with the mid-level data array.

An integral part of the file storing mechanism comprises the low-level data part. The low level data part may have access to one or more primary disks on which to store data. Each primary disk may comprise a data storage drive and must be entirely dedicated for use by the low-level data part of the file storing mechanism. In a representative embodiment, only the low-level data part of the file storing mechanism should be reading or writing to any of the one or more primary disks. Each of the one or more primary disks or data storage drives may be used to provide storage for one or more data pools. As a consequence any one disk need not be used by a single pool. For example, several pools may share the disk, by way of the low-level data part of the file storage mechanism.

The low-level data part is characterized by two main types of states. The first state comprises a transitory state, which may reside on any medium, including volatile memory such as DRAM. However, the transitory state may not be present on the primary disks or data storage drives. In a representative embodiment, one or more persistent data states may be present on the one or more primary disks. Transitory data states are destroyed when a data processing or computing device, which runs the disk pool mechanism, is rebooted. This may happen as a result of a fatal error. For example, this may occur if the data processing or computing device is turned off, or its power is interrupted. The persistent data of a persistent data state used by the low-level part may be further subdivided into two categories: chunks of raw data and metadata. The metadata specifies how the raw data is concatenated together to form the mid-level data array. Each chunk of raw data should exactly match a contiguous portion of the mid-level data array. In a representative embodiment, a chunk of raw data might have an undefined value because it may be used as a "stand-by" chunk, which may be used to form a mirrored data pool. The metadata describes how all the raw data chunks, that are scattered across any number of primary disks, are mapped to the mid-level data array. In a representative embodiment, this metadata may include mirroring and striping information.

It is desirable for at least some of the metadata to be available even when one or more of the disks are unavailable. If a data pool is setup to use mirroring, it is usually set up so that if any one disk is unavailable, at least one copy of each piece of the mid-level data array is still present using the remaining disk or disks. For example, with mirroring and one more disks missing, the low-level part is designed to facilitate the availability of the entire mid-level data array. In a representative embodiment, the low-level part is designed to provide enough diagnostic information to issue a reasonable error message that tells the user which disk is not present in the case where missing disks mean that not all the mid-level data array data is available.

The metadata is distributed across the same disks as the chunks of raw data for the disk. The details of how this metadata is distributed is essential to making the information available when one or more disks is absent and to making the system robust in the face of power interruption that occurs during the middle of an operation. For example, the operation may change the size and/or layout of the raw data on the disks, or perform other changes in the metadata such as modifying the name of a pool.

Various aspects of the present invention utilize the positioning of the metadata with respect to the one or more data storage drives of the file storing mechanism. For example, if the metadata were all simply copied on each disk or data storage drive, the occurrence of a missing disk would not pose an issue; however, a power interruption would cause an issue if one of the disks has been updated but one or more other disks had not been updated. If the meta-data were all on one disk or data storage drive, a power-interruption problem would be easier; however, the file storing mechanism would fail to operate if that one disk containing the meta-data were missing.

Figure 8:
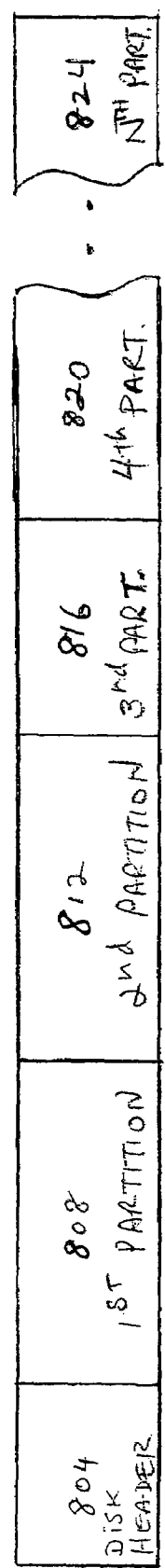
FIG. 8 is a relational block diagram of a structure of a disk or data storage drive that utilizes the file storing mechanism of the present invention, in accordance with an embodiment of the invention.

FIG. 8 is a relational block diagram of a structure of a disk or data storage drive that utilizes the file storing mechanism of the present invention, in accordance with an embodiment of the invention. The beginning of the disk occurs with a fixed-size block called a disk header 804. Additional storage capacity in the form of one or more partitions is represented as blocks 808, 812, 816, 820, 824 in FIG. 8. The nth partition 824 is illustrated as the last partition 824. As illustrated in FIG. 8, a fixed-size block 804 is reserved at the start of every disk or data storage drive for some of the metadata. This fixed-size block 804 is called the disk header 804. The rest of the disk is divided into contiguous, non-overlapping regions called partitions 808, 812, 816, 820, with the disk header 804 specifying, among other things, the start and size of each partition. There may also be some space on any given disk that is not allocated to the disk header 804 or any of the partitions 808, 812, 816, 820, 824; this space may be available for creating new partitions (i.e., when creating new or expanding existing data pools), or extending existing partitions (i.e., when expanding existing data pools). In general, the layout of partitions is determined by one or more partition tables, and there are a number of partition table formats that are used in various systems, such as Linux, Windows, and DOS systems. Various aspects of the present invention allow the formatting of a partition table used by the low-level part of the disk pool mechanism to vary from conventional systems. Also, in comparison with conventional systems, one or more partition table(s), as used in the file storing mechanism of the present invention, is placed in a fixed-size block at the start of the disk or data storage drive. Various aspects of the present invention incorporate dual partition tables in a disk header of the data storage drive. The partition tables are mirror images of each other and are used for redundancy purposes. Dual partition tables are used to protect the integrity of the data stored in the one or more data storage drives when one or more operations are performed. The one or more operations may comprise updating information related to one or more data pools and disk names, for example. In a representative embodiment, the disk header comprises metadata information related to the low-level part of the file storage mechanism.

Figure 9:
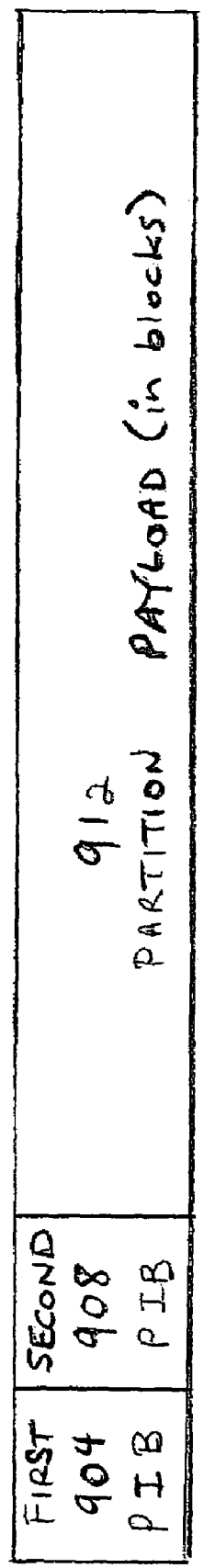
FIG. 9 is a relational block diagram of a partition of a disk or data storage drive in accordance with an embodiment of the invention.

FIG. 9 is a relational block diagram of a partition of a disk or data storage drive in accordance with an embodiment of the invention. In accordance with this embodiment, each partition comprises three components 904, 908, 912. The first two components are termed the first and second pool information blocks (PIBs) 904, 908, respectively, where each PIB comprises 512 bytes. Each of these PIBs 904, 908 may comprise pool meta-data. The third and final component is termed the partition payload 912 and comprises raw data and additional metadata. The size of the partition payload 912 may comprise any number of bytes (or blocks), as specified by a partition table of a disk header. The partition table may specify one or more blocks of a partition. Each of the one or more blocks may comprise 512 bytes. The number of bytes in each of the previously described PIBs or partition payload blocks may vary and other embodiments may be adapted for use in accordance with various aspects of the present invention.

Figure 10:
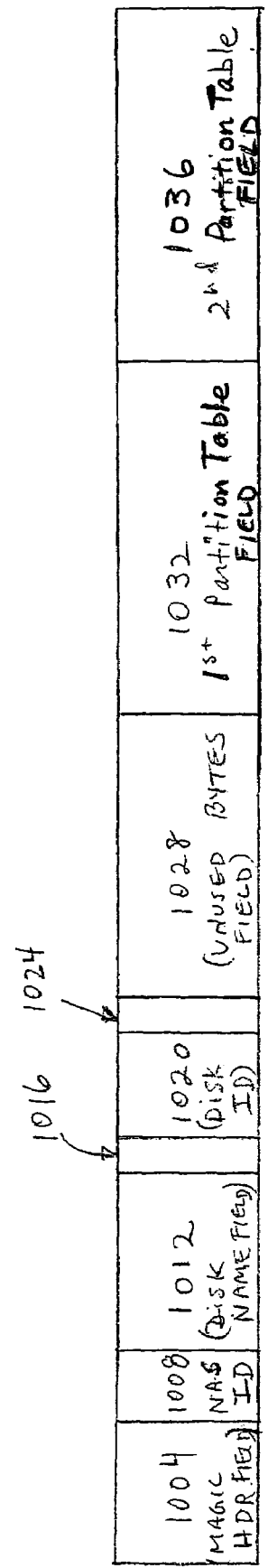
FIG. 10 is a relational block diagram illustrating the structure of a disk header in accordance with an embodiment of the invention.

FIG. 10 is a relational block diagram illustrating the structure of a disk header in accordance with an embodiment of the invention. The disk header comprises 2,560 bytes and comprises the following exemplary fields:

$1^{st}$ field: At offset 0 bytes, a "magic" header field 1004 is used having a length of 34 bytes. This field 1004 contains particular data identifying the associated disk as part of a data pool system used by the low-level part of the disk pool mechanism, in accordance with various aspects of the present invention. Any disk that does not have the first 34 bytes of the disk set to this particular data is not considered part of the data pool system of the file storage mechanism provided by the present invention.

$2^{nd}$ field: At offset 34 bytes, a NAS identifier field 1008 is utilized. A 6 byte identifier is utilized for this field 1008. The six bytes uniquely identifies the machine that formatted the disk to create the disk header. In a representative embodiment, the 6 byte identifier identifies a NAS.

$3^{rd}$ field: At offset 40 bytes, a 41 byte disk name field 1012 is utilized. The 41 byte disk name field 1012 may store an ASCII or Unicode string that is human-readable and may be used as an identifying name. In a representative embodiment, the field 1012 may be zero-terminated, wherein every byte after the first zero byte is set equal to zero, so that the last byte must always be zero.

$4^{th}$ field: At offset 81 bytes, 3 bytes of zero padding are used for the zero padding field 1016.

$5^{th}$ field: At offset 84 bytes, a 16 byte identifier is used to identify the disk by way of the disk identifier field 1020. The 16 byte identifier may be generated randomly or semi-randomly when the disk header is created.

$6^{th}$ field: At offset 100 bytes, a one-byte flag utilized in the flag field 1024 may be used to indicate which of two partition tables residing in the disk header is active. For example, a value of zero may indicate that first table is active while any other value may indicate that the second table is active.

$7^{th}$ field: At offset 101 bytes, 411 unused bytes are utilized in the unused bytes field 1028.

$8^{th}$ field: At offset 512 bytes, the first partition table is stored in the $1^{st}$ partition field 1032. The $1^{st}$ partition table field 1032 comprises 1024 bytes.

$9^{th}$ field: At offset 1536 bytes, the second partition table is stored in the $2^{nd}$ partition table field 1036, which also comprises 1024 bytes.

The second, third, and fifth fields of the disk header (e.g., the NAS identifier, the disk name, and the disk unique identifier) may be used to reference a particular disk, insuring that no two different disks might be confused for one another.

In a representative embodiment, at any given time, only one of the two partition tables is made active, by way of the flag used in the one byte flag field 1024. When changes are made to the partition table, any new information is written into the inactive partition table. For example, all inactive partition tables in the one or more data storage drives are updated at the time an update is made. Because the active table is not modified, an inconsistent state is obviated, such as when a write operation is interrupted by a power failure. In this representative embodiment, each partition table comprises 1024 bytes and is divided into 64 entries of 16 bytes each. Each of the 64 entries of the partition table may either specify a partition in a disk. When all 16 bytes in an entry are equal to zero, the entry is considered empty. If the entry is not empty, the first 8 bytes of the entry specify the starting block number and the other 8 bytes specify the size in blocks of the partition. The start and the size are specified in terms of 512-byte blocks. The starting block number is relative to the start of the disk and points to the partition payload of the partition. The size may specify the size (in blocks) of the partition payload of the partition. In this representative embodiment, the size does not include the two pool information blocks that implicitly come before the payload of each partition. For example, if the partition table specifies a starting block number of 811 and a size of 13 blocks, then the first pool info block for that partition will be block number 809, while the second pool info block for that partition will be block number 810. In this representative embodiment, the partition payload will be blocks 811 through 823 inclusive. In a representative embodiment, the disk header comprises the first 8 blocks; and as a consequence, the lowest valid value for the starting block number of a partition table entry is 10.

Each partition is associated with two pool information blocks that determine the one or more data pools. There are two pool information blocks per partition such that while one copy is being modified the other may be accessed. The two pool information blocks (PIBs) may be referred to as PIB A and PIB B, respectively. The process of updating the pool information blocks comprises the following exemplary methodology. While all the PIB A copies for all the partitions in the pool are being changed, none of the PIB B copies are changed, such that the PIB B copies will always be in a consistent state if the A copies are not. Similarly, while the PIB B copies are being updated, all the PIB A copies are not modified, such that if the PIB B copies are inconsistent, the PIB A copies will all be consistent. The offsets, byte lengths, and field sizes of the previously described disk header fields may vary and other embodiments may be adapted for use in accordance with various aspects of the present invention.

FIG. 11 is a relational block diagram illustrating the structure of a pool information block in accordance with an embodiment of the invention. In a representative embodiment, each pool information block comprises 512 bytes and contains the following exemplary fields:

$1^{st}$ field: At offset 0 bytes, 81 bytes are used for a data pool name field 1104. In a representative embodiment, the data pool name field 1104 is designed to be an ASCII or Unicode string that is human-readable and is used as a name for the data pool associated with this pool information block. In a representative embodiment, the data pool name field may be zero-terminated, with every byte after the first zero byte also equal to zero. As a consequence, the last byte must always be zero in this embodiment.

$2^{nd}$ field: At offset 81 bytes, 3 bytes of zero padding is provided by a first zero padding field 1108.

3rd field: At offset 84 bytes, 16 bytes are used to define a unique data pool identifier in the data pool identifier field 1112. The 16 bytes may be generated randomly or semi-randomly when the pool is created.

4th field: At offset 100 bytes, 6 bytes are used for the NAS identification field (ID) 1116 such that the NAS of the machine that created the data pool is identified. This particular value may correspond to the value that is placed in the NAS identifier field 1008 at offset 34 bytes of the disk header, referenced in FIG. 10. As a result, utilizing a unique data pool identifier, a NAS ID, and a creation time stamp may uniquely identify a data pool. In essence, this three-identifier combination is very unlikely to be used by any other pool. If two different data pools were identified by the same unique data pool identifier, NAS ID, and creation time stamp, confusion may exist about what partitions are used to form one or more data pools. For example, any two pools created on the same NAS should have different time stamps and any two pools created on two different NAS' should have different NAS IDs. By using random values for the unique data pool identifier, the likelihood of using the same three-identifier combination decreases. In certain situations, the NAS ID might be different from the NAS ID of the NAS currently using the data pool because one or more data storage drives or disks might have been removed from one NAS and inserted into another. The NAS ID of a data pool information block may be different from the NAS ID in the disk header of a data storage drive or disk used by a data pool if the data storage drive or disk was first used by one NAS while the data pool was subsequently created or generated by another NAS. The NAS ID in the disk header is not changed when the partition tables are updated since the NAS ID in the disk header should correspond to the NAS that first created the disk header on the disk. This allows the NAS ID in the disk header to distinguish itself amongst different disks or data storage drives. Likewise, the NAS ID in the pool information block helps allow different pools to be distinguished.

$5^{th}$ field: At offset 106 bytes, 2 bytes of zero padding are added within a second zero padding field 1120.

6th field: At offset 108 bytes, 9 bytes are used to specify a creation time/date stamp for a data pool specified within the creation time/date stamp field 1124. As with the NAS ID field 1116, the time and date is recorded to help uniquely identify a particular pool and to distinguish a pool from other pools. The first 4 bytes comprise the year, the next byte comprises the month (1-12), the next byte comprises the day of the month (1-31), the next byte comprises the hour (0-23), the next byte comprises the minutes (0-59), while the final byte comprises seconds (0-59). In a representative embodiment, the time/date stamp is expressed in terms of Universal Time.

$7^{th}$ field: At offset 117 bytes, 3 bytes of zero padding are added to a third zero padding field 1128.

8th field: At offset 120 bytes, there are 4 bytes that specify the number of stripes or striped partitions in the data pool. The 4 bytes are located in the stripes field 1132. In a representative embodiment, a value of 1 signifies that striping is not used. For example, there must be at least two stripes for striping to be meaningful. Striping with a single stripe is equivalent to no striping while a value of zero comprises an illegal value.

9th field: At offset 124 bytes, there are 4 bytes that specify the number of mirrors or mirrored partitions in the data pool. These 4 bytes are located in the mirrors field 1136. In a representative embodiment, a value of 1 signifies that mirroring is not used while a value of zero is illegal.

$10^{th}$ field: At offset 128 bytes, 4 bytes specifying the number of spares in the pool is used in the spares field 1140. In a representative embodiment, a value of 0 indicates that no spares are available.

11th field: At offset 132 bytes, there are 4 bytes specifying the number of the pane associated with a partition. 4 bytes are used in the pane field 1144. Panes comprise striping, mirroring, and spare data units that are used to produce or generate an entire data pool. The total number of panes associated with a data pool comprises (NST*(NM*NSP)) where NST comprises the number of stripes or striped panes (at offset 120), NM is the number of mirrors or mirrored panes (at offset 124 bytes above), and NSP is the number of spares or spare panes. In a representative embodiment, the panes in a data pool are numbered from zero to one less than the total number of panes. For example, the panes are numbered starting with all the stripes for the first mirror followed by all the stripes for the second mirror, and so forth and so on. This is followed by all the stripes for the first spare followed by all the stripes for the second spare, and so forth and so on.

12th field: At offset 136 bytes, there are 4 bytes in the chunks field 1148, that specifies the number of chunks in the pane specified in the pane field 1144. Using one or more chunks, a pane may be spread among multiple partitions over one disk (or data storage drive) or across any number of disks. One or more chunks are gathered from all partitions in all disks corresponding to a pane. The chunks are concatenated to form a pane. This chunks field 1148 specifies how many chunks there are in a particular pane. In a representative embodiment, the minimum value of a chunks field is 1.

13th field: At offset 140 bytes, there are 4 bytes comprising a chunk identifier that specifies which chunk is represented in a pane. The chunk identifier is stored in the chunk identifier field 1152. In a representative embodiment, the chunks are numbered from zero to one less than the total number of chunks in the pane. This numbering specifies the order in which the partitions may be concatenated in order to form the pane. The chunk identifier is contained in the chunk identifier field 1148.

$14^{th}$ field: At offset 144 bytes, there are 4 bytes used in the RAID chunk field 1156 that specifies the RAID chunk size. The RAID chunk size is an implementation detail used in the implementation of the code to concatenate partitions and perform mirroring and striping. It maintains the same value for all pool information blocks in a given data pool. Note that the term "chunk" here is not the same as the term "chunk" used in describing the fields at offsets 136 and 140.

$15^{th}$ field: At offset 148 bytes, there are 108 bytes of pane partition specification that determines which partition is used as the next pane of this data pool. A partition specification is populated in a pane partition specification field 1160. The partition specification comprises 81 bytes that specifies the name of the disk on which the partition resides, 1 byte of zero padding, 6 bytes specifying the NAS ID, 16 bytes comprising a disk unique ID for the disk containing the specified partition, and 4 bytes comprising the number of the partition being specified, for a total of 81+1+6+16+4=108 bytes. If the partition associated with the pane partition specification corresponds to the last pane, this pane partition specification field specifies the first pane in the next data pool, so the pane partition specification field provides a link between partitions. Various aspects of the invention provide that should only one pane exist in the data pool, the pane partition specification field 1156 simply refers back to itself, if the partition is the only partition in its pane.

16$^{th}$ field: At offset 256 bytes, there are 108 bytes of chunk partition specification that determines which partition is the next chunk of the pane of this partition. The chunk partition specification is utilized within the chunk partition specification field 1164. Should this partition be the last in the pane, this field points back to the first chunk in the associated pane. So if the pane consists of only a single partition, this field specifies itself.

17$^{th}$ field: At offset 364 bytes, 4 bytes are used in a resize flag field 1168 to indicate whether or not the data pool is currently in the midst of a resizing operation. In a representative embodiment, a value of zero means it is not undergoing a resizing operation. Else, a value of one indicates that it is undergoing a resizing operation. In this embodiment, all other values are considered illegal. In a representative embodiment, the NAS stores information when a resizing operation is in progress. This information is used so that if the resizing operation is interrupted, the NAS may restore itself to its state prior to the resizing operation, such that its data is not lost or corrupted. Various aspects of the present invention utilize the remaining the fields in the pool information block when a resizing operation is performed on its associated data pool. In a representative embodiment, the validity marker utilized in the last field of the pool information block, is not used in the resizing operation.

18$^{th}$ field: At offset 368 bytes, there are 8 bytes used in the reverse progress field 1172 that indicate how far a resizing operation has progressed in the reverse direction. When resizing a data pool, each partition may grow or shrink in size (including shrinking to zero, for a partition being removed, or growing from zero for a partition being added), so data might have to be moved forward or backward within the pane. The ordering of these data movements is very important in order to prevent overwriting of data. This data shifting or data transfer is performed by first moving forward through the pane while copying data in a reverse direction and then followed by moving backward through the pane while copying data in the forward direction. The 8 bytes are stored in a reverse progress field 1172 that specifies the progress that has been made in the reverse direction. If the resize operation is interrupted, the data shifting in the reverse direction is restarted at the correct point based on this field.

19$^{th}$ field: At offset 376 bytes, there are 8 bytes that indicate how far a resize operation has progressed in the forward direction. This is the counterpart to the previously discussed reverse progress field and is measured in terms of the number of bytes progressed in the forward direction. A forward progress field 1176 is utilized here.

20$^{th}$ field: At offset 384 bytes, there are 8 bytes which indicate the old size (in kilobytes) when a resize operation is performed. Note that this may be zero to indicate that the associated partition is being newly added during a resizing operation. The 8 bytes are stored in a old size field 1180.

21$^{st}$ field: At offset 392 bytes, there are 8 bytes used in a new size field 1184 that indicate the new size in kilobytes of the associated partition for a resize operation. Note that this may be equal to zero, indicating that this partition is being removed by the resizing operation.

22$^{nd}$ field: At offset 400 bytes, there are 96 bytes of zero padding stored in the fourth zero padding field 1188.

23$^{rd}$ field: At offset 496 bytes, there are 16 bytes which indicate that the block is a valid pool information block. In a representative embodiment, the 16 bytes are stored in a valid pool information field 1192. There is a binary value that this field 1192 must match for this pool information block to be considered as valid. This ensures that if this pool information block doesn't contain valid pool information block data, it is not interpreted as such. If, for example, this field is absent, the file storage system may ignore the pool information block. The offsets, byte lengths, and field sizes of the previously described pool information block fields may vary and one or more other embodiments may be adapted for use in accordance with various aspects of the present invention.

Figure 12:
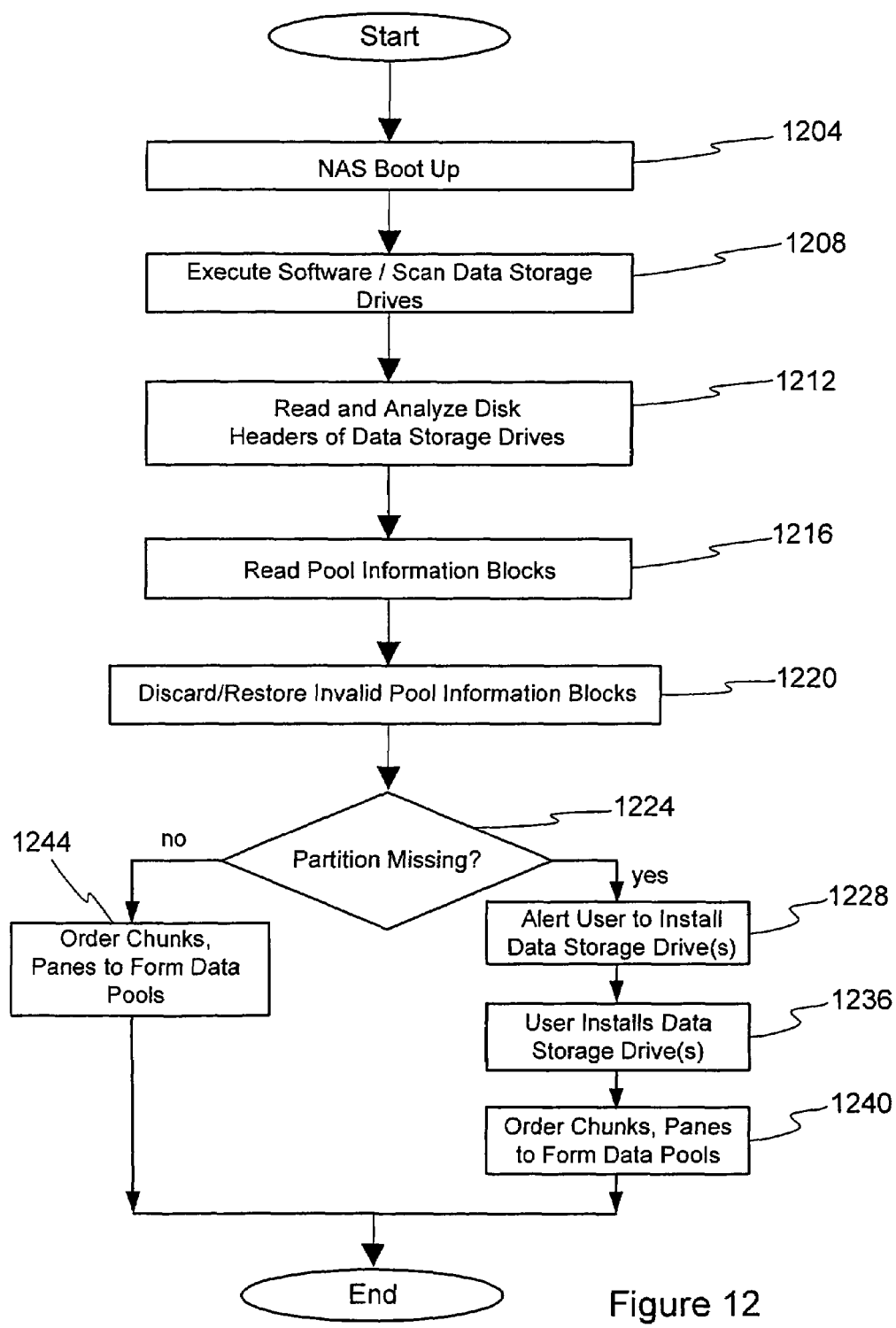
FIG. 12 is an operational flow diagram illustrating a boot up process allowing the NAS to implement one or more data pools using one or more data storage drives, in accordance with an embodiment of the present invention.

FIG. 12 is an operational flow diagram illustrating a boot up process allowing the NAS to implement one or more data pools using one or more data storage drives, in accordance with an embodiment of the present invention. Of course, in a representative embodiment, the one or more data storage drives may comprise one or more hard disk drives. The NAS, by way of the boot up process, illustrated in FIG. 12, allows the NAS to link or concatenate the one or more partitions provided by the one or more data storage drives, such that one or more data pools are implemented. The NAS reads the disk headers and pool information blocks of the data storage drives, allowing the NAS to implement the one or more data pools. At step 1204, the NAS boots up and during this boot up process, it recognizes and examines one or more of its data storage drives. At step 1208, the software residing within a memory of the NAS (as described earlier in reference to FIG. 2) is executed, so as to scan and analyze the data storage drives. During this boot up process, one or more data storage drives that are added may be discovered or recognized by the NAS. At step 1212, the software identifies the partitions in a data storage drive by reading the disk headers associated with the data storage drives. Next, at step 1216, the software facilitates reading of the pool information blocks for each partition of the one or more data storage drives. At step 1220, any pool information block that is considered invalid is discarded. One or more discarded pool information blocks are restored, if necessary, by using its corresponding (or duplicate) pool information block. Next, at step 1224, the NAS determines if any partitions are missing. For example, if a chunk or pane partition specification indicates a particular partition which cannot be located, the NAS may determine that the partition is missing and the process proceeds to step 1228. At step 1228, the NAS may alert the user to install one or more data storage drives, which may have been previously removed. At step 1236, the user rectifies the problem, by inserting the one or more data storage drives containing the missing partitions, for example. Next, at step 1240, one or more chunks and panes in the one or more data storage drives are sequenced or ordered based on the chunk and pane partition specifications. Thereafter, the process ends. If at step 1224, no partition is missing, then the process continues at step 1244 such that the one or more chunks and panes in the one or more data storage drives are sequenced or ordered, so as to generate one or more appropriate data pools as required. Thereafter, the process ends.

Figure 13:
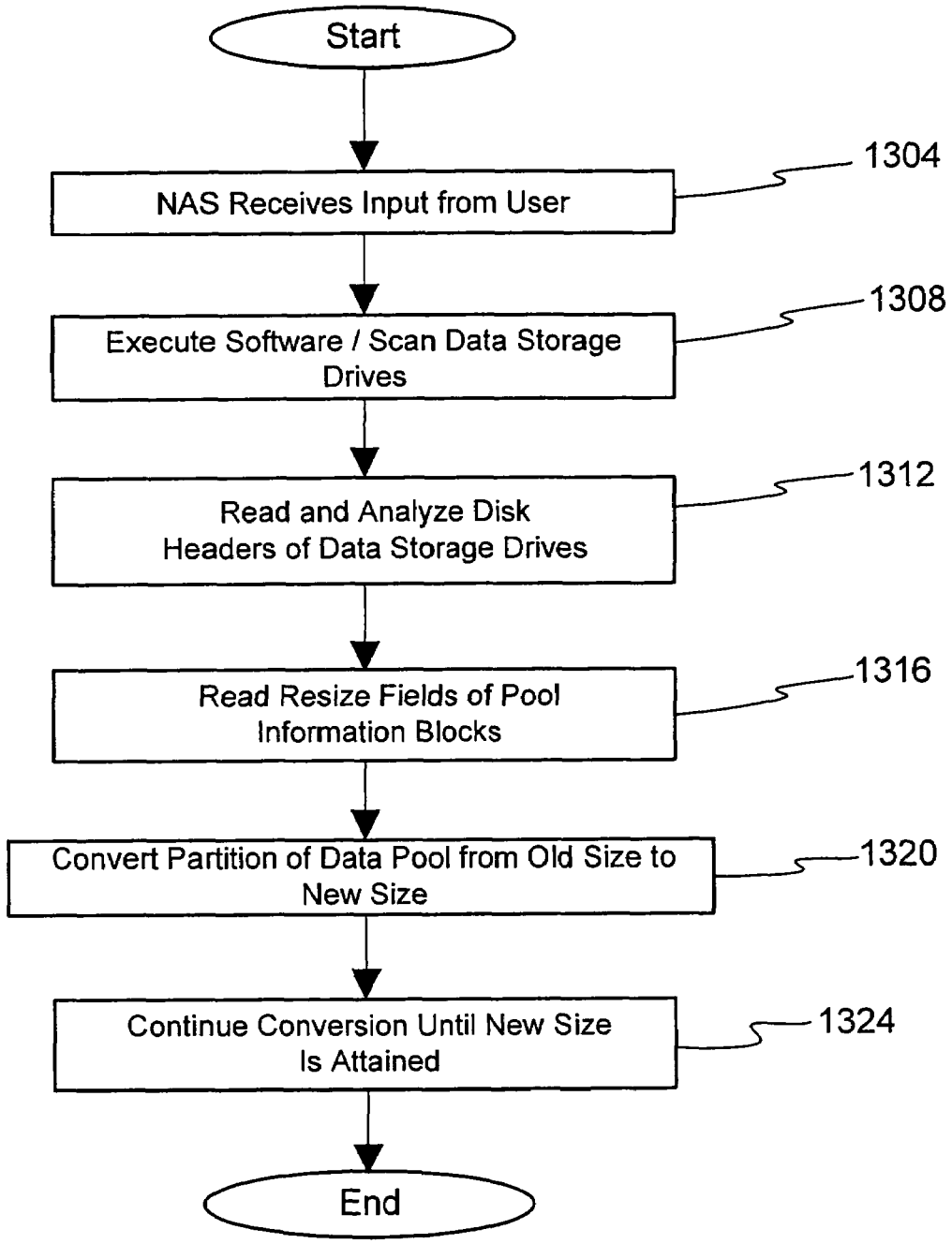
FIG. 13 is an operational flow diagram illustrating a resizing operation of a partition in a data storage drive of one or more data storage drives of a data storage device, in accordance with an embodiment of the invention.

FIG. 13 is an operational flow diagram illustrating a resizing operation of a partition in a data storage drive of one or more data storage drives of a data storage device, in accordance with an embodiment of the invention. The data storage device may comprise a network attached storage device (NAS). In a representative embodiment, the resizing operation may comprise adding or deleting a data pool to the NAS.

At step 1304, a user provides an input, such as a request, to the NAS initiating the resizing operation. The input may occur over a user interface, such as that previously described in FIG. 5. For example, the user may input a "new pool name", indicate mirroring or striping, and determine the amount of capacity to be dedicated when adding a new data pool. At step 1308, the software residing within a memory of the NAS, may be executed by way of control provided by a processor (as was described in reference to FIG. 2). The executed software may scan and analyze the one or more disk headers provided by the one or more data storage drives of the NAS. At step 1312, the executed software reads and analyzes the disk headers of the one or more data storage drives. The dual partition tables used within a disk header references one or more partitions in the one or more data storage drives. At step 1316, a number of resize fields within at least one pool information block of each pool information block pair are located and read. During the scanning process, the executed software may locate one or more fields in the pool information blocks used in the resizing operation. As indicated earlier in reference to FIG. 11, the scanning process may locate a resize flag, a reverse progress, a forward progress, an old size, and a new size field. At step 1320, the partition in the data storage drive is resized or converted from an old size to a new size, based on the old and new size fields. The reverse progress and forward progress fields are used to monitor the progression of the resize operation in the reverse or forward direction, respectively. At step 1324, the conversion process continues until the new size is attained. For example, the process may end when a partition is deleted, added, or resized to a certain size.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of implementing a data pool using one or more data storage drives comprising:
   first generating a first partition table and a second partition table, said first partition table being a mirror image of said second partition table, said first and/or said second partition tables providing the location and size of one or more partitions in a data storage drive of said one or more data storage drives of a data storage device; and
   second generating a first pool information block and a second pool information block, said first pool information block being a mirror image of said second pool information block, said first or said second pool information blocks used for identifying and concatenating one or more partitions, said first and/or said second pool information blocks stored within each of said one or more partitions in said one or more data storage drives.

2. The method of claim 1 further comprising identifying at least one or more chunks and panes of said one or more partitions; and
   concatenating said one or more chunks and panes to form said data pool.

3. The method of claim 1 wherein said data storage drive comprises a hard disk drive.

4. The method of claim 1 wherein each of said first pool information block and said second pool information block comprises a field that is used to specify a name of said data pool.

5. The method of claim 1 wherein each of said first pool information block and said second pool information block comprises a field used for identifying said data storage device.

6. The method of claim 1 wherein each of said first pool information block and said second pool information block comprises a field used for identifying a creation date and time of said data pool.

7. The method of claim 1 wherein each of said first pool information block and said second pool information block comprises a field used for identifying the number of mirrored partitions in said data pool.

8. The method of claim 1 wherein each of said first pool information block and said second pool information block comprises a field used for identifying the number of striped partitions in said data pool.

9. The method of claim 1 wherein each of said first and said second partition tables provides the location of the next partition of said data pool in said one or more data storage drives.

10. The method of claim 1 wherein each of said first pool information block and said second pool information block comprises a field used for identifying whether the pool information block is valid.

11. A machine-readable storage having stored thereon at least one code section for processing data, the at least one code section being executable by a machine for causing the machine to perform the steps comprising:
    first generating a first partition table and a second partition table, said first partition table being a mirror image of said second partition table, said first and/or said second partition tables providing the location and size of one or more partitions in a data storage drive of said one or more data storage drives of a data storage device; and
    second generating a first pool information block and a second pool information block, said first pool information block being a mirror image of said second pool information block, said first or said second pool information blocks used for identifying and concatenating one or more partitions, said first and/or said second pool information blocks stored within each of said one or more partitions in said one or more data storage drives.

12. The machine-readable storage according to claim 11, further comprising code for:
    identifying at least one or more chunks and panes of said one or more partitions; and concatenating said one or more chunks and panes to form said data pool.

13. The machine-readable storage according to claim 11 wherein said data storage drive comprises a hard disk drive.

14. The machine-readable storage according to claim 11 wherein each of said first pool information block and said second pool information block comprises a field that is used to specify a name of said data pool.

15. The machine-readable storage according to claim 11 wherein each of said first pool information block and said second pool information block comprises a field used for identifying said data storage device.

16. The machine-readable storage according to claim 11 wherein each of said first pool information block and said second pool information block comprises a field used for identifying a creation date and time of said data pool.

17. The machine-readable storage according to claim 11 wherein each of said first pool information block and said second pool information block comprises a field used for identifying the number of mirrored partitions in said data pool.

18. The machine-readable storage according to claim 11 wherein each of said first pool information block and said second pool information block comprises a field used for identifying the number of striped partitions in said data pool.

19. The machine-readable storage according to claim 11 wherein each of said first and said second partition tables provides the location of the next partition of said data pool in said one or more data storage drives.

20. The machine-readable storage according to claim 11 wherein each of said first pool information block and said second pool information block comprises a field used for identifying whether the pool information block is valid.

21. A system comprising:
a memory storing a code; and
a processor for executing said code, wherein said executing performs:
first generating a first partition table and a second partition table, said first partition table being a mirror image of said second partition table, said first and/or said second partition tables providing the location and size of one or more partitions in a data storage drive of said one or more data storage drives of a data storage device; and
second generating a first pool information block and a second pool information block, said first pool information block being a mirror image of said second pool information block, said first or said second pool information blocks used for identifying and concatenating one or more partitions, said first and/or said second pool information blocks stored within each of said one or more partitions in said one or more data storage drives.

22. The system of claim 21, wherein said executing further performs:
identifying at least one or more chunks and panes of said one or more partitions; and concatenating said one or more chunks and panes to form said data pool.

23. The system of claim 21 wherein said data storage drive comprises a hard disk drive.

24. The system of claim 21 wherein each of said first pool information block and said second pool information block comprises a field that is used to specify a name of said data pool.

25. The system of claim 21 wherein each of said first pool information block and said second pool information block comprises a field used for identifying said data storage device.

26. The system of claim 21 wherein each of said first pool information block and said second pool information block comprises a field used for identifying a creation date and time of said data pool.

27. The system of claim 21 wherein each of said first pool information block and said second pool information block comprises a field used for identifying the number of mirrored partitions in said data pool.

28. The system of claim 21 wherein each of said first pool information block and said second pool information block comprises a field used for identifying the number of striped partitions in said data pool.

29. The system of claim 21 wherein each of said first and said second partition tables provides the location of the next partition of said data pool in said one or more data storage drives.

30. The system of claim 21 wherein each of said first pool information block and said second pool information block comprises a field used for identifying whether the pool information block is valid.

* * * * *